United States Patent Office 3,324,016
Patented June 6, 1967

3,324,016
PROCESS FOR PREPARING FLUORINE
Horst G. Langer, Cochituate, Mass., assignor to The Dow Chemical Company, Midland, Mich., a corporation of Delaware
No Drawing. Filed June 5, 1964, Ser. No. 373,068
6 Claims. (Cl. 204—60)

This invention relates to a novel method of preparing elemental fluorine from metal fluorides and more particularly is concerned with a novel process for producing elemental fluorine by reacting calcium fluoride and titanium dioxide.

With the increasing industrial importance of fluorine and its compounds in the past few years for use in making, for example, fluorinated hydrocarbon liquids and solids, a need for a simple and economical process exists for rapidly producing quantities of fluorine.

It is the principal object of the present invention to provide a novel method for preparing fluorine employing common and abundantly available raw materials.

Other objects and advantages will become apparent from the detailed description of the invention which follows.

Accordingly, the process of the present invention comprises in general the steps of providing a reaction mixture of an inorganic metal fluorine-containing salt, for example, calcium fluoride, and an inorganic oxygen-containing scavenging agent such as titanium dioxide, which agent is reactive with the metal component of said fluorine-containing salt, and electrolyzing said mixture in an inert gaseous atmosphere, such as argon or nitrogen, at a minimum temperature sufficient to melt the reactants but below the boiling point of the reaction mass, thereby to liberate elemental gaseous fluorine which may then readily be recovered.

In the present process, electrolysis of the electrolyte, that is, the reactants of the reaction mass, ordinarily is carried out at a reaction temperature of from about 2000° C. to about 3000° C. while applying a potential of from about 20 to about 40 volts at about 150 to about 200 amperes. Optimally, a temperature of from about 2500° C. to about 3000° C. is employed.

The reaction temperature, as well as the required potential and current required for electrolysis, may be obtained by use of an electric arc furnace. Normally, a low potential of from about 5 to about 10 volts at from about 50 to about 100 amperes is first applied for about 15 to 30 minutes to accomplish melting of the mix. Thereafter, the required operating potential is applied to carry out the electrolysis.

In actual operation of the process in such a furnace, ordinarily the reaction mixture is placed in a carbon crucible as an anode and an arc established with the crucible and contents by contacting it with a carbon cathode rod, thereby to melt and electrolyze the reaction mixture. After the electrolyte has melted, the cathode rod is withdrawn slightly so as to provide a gap between the melt and the rod, whereupon the full operating potential is then applied. Other sources of heat, of course, may also be employed provided the required potential for electrolyses is also applied to the reaction mixture.

The elemental fluorine gaseous product is readily recovered, for example, by condensing in a low temperature trap such as a liquid nitrogen trap. However, other traps may precede said nitrogen trap if desired, such as an air cooled reservoir into which, for example, unreacted material blown over from the reactor may be caught. This can be followed by, for example, a water cooled column to precool the gaseous fluorine before it enters the nitrogen trap. The fluorine so-recovered may either be placed in suitable pressure vessels at normal temperatures or in vessels at atmospheric pressure with cooling.

The inorganic fluorine-containing salt and scavenging agent reactants for use in the present invention ordinarily are reacted in molar proportions such to provide at least 2 moles of oxygen per mole of fluorine. Smaller amounts of the oxygen-containing scavenging agent may be employed provided additional oxygen is present to provide the required oxygen-fluorine ratio during the reaction. For example, oxygen gas can be introduced or metered into the reactor or arc furnace during the reaction. It is more practical, however, to employ the oxygen-containing scavenging agent and inorganic fluorine-containing salts in the aforesaid molar proportions. Substantially stoichiometric mole proportions are preferred.

In carrying out the process of the present invention in its preferred form to obtain fluorine from fluorspar ore by reaction with $TiO_2$, the ore is preferably pulverized to a particle size such that about 95 percent thereof is from 80 to 100 mesh (U.S. Standard Sieve Series), or otherwise finely divided. This is admixed with titanium dioxide in a molar ratio of titanium dioxide to fluorspar of about 2 (equivalent to an oxygen to fluorine mole ratio of about 2), whereupon the mixture is charged into a carbon crucible (anode) of an electric arc furnace, said furnace being equipped with a hood means for collecting the fluorine gas to be generated. A carbon electrode is then contacted with the reaction mixture and an electric potential applied thereto to melt and by electrolysis produce fluorine from the reaction mixture. An atmosphere, such as of argon gas which is inert to the reaction mass, is maintained in the furnace throughout the reaction period. This gas also serves as a carrier for the liberated fluorine. The fluorine so-generated comprises from about 30 to about 50 percent of the evolved gases. The calcium reacts with the titanium dioxide to form $CaTiO_3$ according to the following equation:

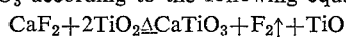
$$CaF_2 + 2TiO_2 \xrightarrow{\Delta} CaTiO_3 + F_2\uparrow + TiO$$

Because substantially stoichiometric amounts of the reactants are used, essentially only elemental fluorine is formed rather than fluorine compounds. The fluorine gas product is collected by condensation in a liquid nitrogen cooled trap or condenser. So-collected and condensed the fluorine gas may then be further purified and singly recovered from the argon and any other contaminant gases formed by, for example, fractional distillation and absorption.

If desired the reaction mixture can be fed continuously to the crucible replacing that involved in the reaction.

Metal inorganic fluorine-containing salts suitable for use in the present invention include both simple and complex fluorides, the metal cation component of the simple fluorides being a member of Group I-A or II-A of the Mendeleeff periodic arrangement of the elements. Examples of suitable fluoride salts are calcium fluoride ($CaF_2$), sodium fluoride (NaF), potassium fluoride (KF), sodium fluoroaluminate ($Na_3AlF_6$), sodium fluorosilicate ($Na_2SiF_6$), fluoroapatite ($Ca_{10}(PO_4)_6F_2$), and the like.

The inorganic scavenging agents suitable for use in the present process are oxygen-containing materials which are reactive with the metal components of the fluorine-containing salt. Examples of typical scavenging agents are oxides such as zirconium oxide ($ZrO_2$), titanium dioxide ($TiO_2$), hafnium oxide ($HfO_2$), lead oxide ($PbO_2$), borates such as potassium metaborate ($K_2B_2O_4$), potassium tetraborate ($K_2B_4O_7$), aluminum oxides such as alumina ($Al_2O_3$), beryllium aluminate ($BeAl_2O_4$), complex iron oxides such as iron aluminate ($FeAl_2O_4$), iron phosphate ($Fe_3P_2O_8$), ferrous metatitanate ($FeTiO_3$), and Ilmenite ($FeO \cdot TiO_2$), and the like.

The method of the present invention is further illustrated by the following example which is not to be construed as limiting the invention thereto.

*Example*

About 78 grams of calcium fluoride (approximately 2 moles fluorine) together with about 160 grams of titanium dioxide (approximately 4 moles oxygen) were placed in a graphite crucible of an electric arc furnace in an argon atmosphere. An electric arc at a low potential was established by means of a carbon cathode which melted and applied an electric potential to the reaction mixture. A reaction temperature of from about 2500° C. to about 3000° C. was employed, the maximum potential applied and reached during the 3-hour reaction period being about 40 volts at 200 amperes. The product gases were collected and precooled in a series of three condensers or traps comprising in sequence an air cooled column, a water cooled column, and a column cooled by a Dry Ice-acetone mixture. After passing through these precoolers, fluorine finally was condensed in a liquid nitrogen cooled condenser. Approximately a 40 to 60 percent conversion or fluorine product yield was obtained based on the original available fluorine content in the reaction mixture. It should be understood that essentially a 100 percent conversion may be obtained by extending the reaction period so as to completely consume the reactants and convert all the fluorine values in the melt to the elemental fluorine product.

Similar to the foregoing, the other fluorine salts specified hereinbefore may be subjected to electrolysis and heat in an inert atmosphere in accordance with the present invention with one of the other scavenging agents also specified hereinbefore to prepare elemental fluorine therefrom.

The present invention may be modified or changed without departing from the spirit or scope thereof and it is understood that I limit myself only as defined in the appended claims.

I claim:

1. A method for preparing elemental fluorine which comprises, providing a reaction mixture of an inorganic metal fluorine-containing salt and an inorganic oxygen-containing scavenging agent which is reactive with the metal component of said fluorine-containing salt, said scavenging agent-to-fluorine-containing salt being present in a mole ratio of at least about 2, based on the oxygen-to-fluorine content in said reactants, electrolyzing said reaction mixture at a temperature within the range of from about 2000° C. to about 3000° C. thereby to liberate elemental gaseous fluorine therefrom, and recovering said gaseous fluorine.

2. The method of claim 1 wherein the inorganic fluorine-containing salt and scavenging agent are reacted in substantially stoichiometric mole proportions.

3. The method of claim 1 wherein the fluorine-containing salt is a member of the group consisting of calcium fluoride, sodium fluoride, potassium fluoride, sodium fluoroaluminate, sodium fluorosilicate, and fluoroapatite.

4. The method of claim 1 wherein the oxygen-containing scavenging agent is a member selected from the group consisting of zirconium oxide, titanium dioxide, hafnium oxide, lead oxide, potassium metaborate, potassium tetraborate, beryllium aluminate, iron aluminate, iron phosphate, ferrous metatitanate and Ilmenite.

5. The method of claim 1 wherein the step of recovering comprises condensing the gaseous elemental fluorine product.

6. The method of preparing elemental fluorine by electrolysis of fluorspar which comprises the steps of providing a mixture of fluorspar and titanium dioxide, the molar proportions of titanium dioxide to calcium fluoride in said fluorspar being at least 2, reacting said mixture at a temperature of from about 2500° C. to about 3000° C. in an inert gaseous atmosphere while applying through the mixture an electric potential, thereby to liberate elemental gaseous fluorine therefrom, condensing said gaseous fluorine, and recovering the fluorine so condensed.

References Cited

UNITED STATES PATENTS 2,531,046  11/1950  Hollingsworth ____ 23—215 X
2,726,928  12/1955  Hollingsworth ____ 23—215 X

OTHER REFERENCES

Simons, J. H.: "Fluorine Chemistry," Academic Press Inc., pp. 293–313, 1950.

JOHN H. MACK, *Primary Examiner.*

G. KAPLAN, *Assistant Examiner.*